United States Patent [19]

Kawazoe et al.

[11] Patent Number: 5,219,614

[45] Date of Patent: Jun. 15, 1993

[54] METHOD FOR LINING PIPE INNER SURFACE IN MULTIBRANCH PIPING

[75] Inventors: Masato Kawazoe, Tokyo; Takaharu Tomoyasu, Ichihara, both of Japan

[73] Assignee: Mitsui Petrochemical Industries, Ltd., Tokyo, Japan

[21] Appl. No.: 873,703

[22] Filed: Apr. 22, 1992

Related U.S. Application Data

[63] Continuation of Ser. No. 653,994, Feb. 12, 1991, abandoned, which is a continuation of Ser. No. 384,445, Jul. 25, 1989, abandoned.

[30] Foreign Application Priority Data

| Jul. 29, 1988 | [JP] | Japan | 63-191958 |
| Sep. 2, 1988 | [JP] | Japan | 63-220016 |
| Sep. 12, 1988 | [JP] | Japan | 63-227848 |

[51] Int. Cl.$^5$ ............................................. B05D 7/22
[52] U.S. Cl. .................................... 427/238; 427/239
[58] Field of Search ................................. 427/238, 239

[56] References Cited

U.S. PATENT DOCUMENTS

| 4,397,890 | 8/1983 | Kinumoto et al. | 427/238 X |
| 4,454,173 | 6/1984 | Koga | 427/238 X |
| 4,454,174 | 6/1984 | Koga | 427/238 X |
| 4,556,580 | 12/1985 | Kamuro et al. | 427/238 X |

FOREIGN PATENT DOCUMENTS

| 60-58274 | 4/1985 | Japan . |
| 60-168564 | 9/1985 | Japan . |
| 60-175579 | 9/1985 | Japan . |
| 60-175580 | 9/1985 | Japan . |
| 62-10707 | 1/1987 | Japan . |

*Primary Examiner*—Janyce Bell

[57] ABSTRACT

The present invention provides a method capable of lining a multibranch piping with a coating material within the pot life of the coating material without leaving an area uncoated or having to apply excessive repeated coatings. Lining of a main pipe is performed by pouring the coating material into the main pipe from an end portion of the pipe, and the lining of branch pipes is effected by the feed of the coating material and air for each of the branch pipes. A completed time point of lining in each branch pipe is detected by any one of the following methods:

(A) A method wherein the time required for lining a branch pipe is estimated in advance and upon lapse of the estimated time it is determined that the lining of the branch pipe was completed.

(B) A method wherein a change in gas pressure in the main pipe which occurs upon the coating material reaching the connection between a branch pipe and the main pipe under the feed of air is detected by a pressure gauge, whereupon it is determined that the lining operation of the branch pipe was completed.

(C) A method wherein when the coating material fed from an end portion of one branch pipe was discharged from another branch pipe located in a position close to the one branch pipe, it is judged that the lining was completed.

8 Claims, 4 Drawing Sheets

METHOD FOR LINING PIPE INNER SURFACE IN MULTIBRANCH PIPING

This application is a continuation of application Ser. No. 07/653,994 filed on Feb. 12, 1991, now abandoned, which is a continuation of application Ser. No. 07/384,445, filed on Jul. 25, 1989, now abandoned.

BACKGROUND OF THE INVENTION

The present invention relates to a method for lining the inner surfaces of pipes in a multibranch piping.

Heretofore, as means for lining the inner surfaces of pipes in a multibranch piping there have been proposed such methods as disclosed in Japanese Patent Laid-Open Nos. 175579/85 and 175580/85 and Japanese Patent Publication Nos. 8233/87, 55911/87, 10707/87 and 26830/87.

Figure 6:
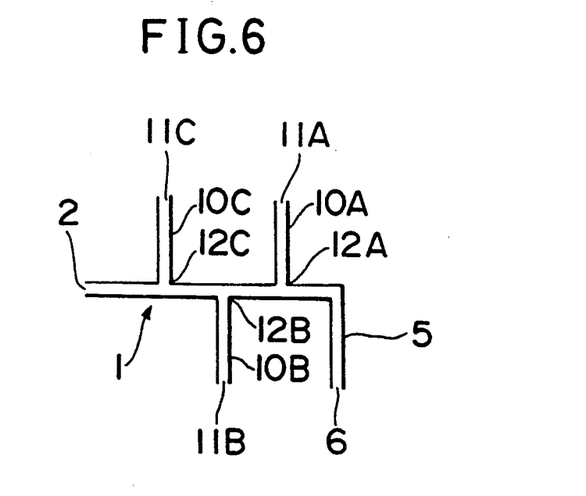
FIG. 6 is an explanatory view of a conventional lining method.

According to the method described in the above Japanese Patent Laid-Open No. 175579/85, in such a multibranch piping as shown in FIG. 6, a coating material and then air are fed from a start end 6 of a main pipe 1, then upon detection that the coating material reached ends 11A, 11B and 11C of branch pipes 10A, 10B, 10C, respectively, the ends 11A, 11B and 11C are closed successively to complete the lining of the branch pipes 10A, 10B, 10C, while the lining operation is continued for the main pipe 1 until the coating material reaches a terminal end 2 of the main pipe.

According to the lining method described in Japanese Patent Laid-Open No. 175580/85, air is fed back from pipe ends 11 at which a coating material has arrived in the same manner as in the method of the foregoing Laid-Open No. 175579/85.

According to the lining method described in Japanese Patent Publication No. 8233/87, a coating material and then air are fed from the start end 6, and when the coating material has reached the end 11A of the branch pipe 10A, the amount of air fed from the start end 6 is decreased and at the same time air is fed back from the end 11A to send back the coating material.

According to the lining method described in Japanese Patent Publication No. 55911/87, a coating material and then air are fed from the start end 6 and it is detected by a pressure gauge mounted in the end 11A of the branch pipe 10A that the coating material has reached a branch point 12A, whereupon the air fed from the start end 6 is stopped, then the coating material and air are fed from the end 11A to effect a lining for the inner surface of the branch pipe 10A and that of the main pipe 1 which follows.

According to the lining method described in Japanese Patent Publication No. 10707/87, a coating material and then air are fed from the ends 11A, 11B and 11C of the branch pipes 10A, 10B and 10C, respectively, and it is detected that the coating material has reached branch points 12A, 12B and 12C, by measuring a change in pressure of the compressed air fed into the pipes, to complete the lining operation.

According to the lining method described in Japanese Patent Publication No. 26830/87, there are adopted different lining start timings for the branch pipes 10A, 10B and 10C so that the lining operations for those pipes are completed simultaneously.

The methods described in the above Japanese Patent Laid-Open Nos. 175579/85, 175580/85 and Publication No. 8233/87 are each disadvantageous in that (1) when the coating material is fed continuously, the main pipe 1 is coated repeatedly, resulting in the lining of the main pipe becoming too thick, and (2) where the coating material is fed batchwise at a time, even when the coating material has reached the end 11A of the branch pipe 10A there still remain in the main pipe 1 a large amount of the coating material for lining the other pipes, and also in the branch pipe 10A there is a surplus of the coating material, so it is necessary to feed air back from the end 11A of the branch pipe 10A to return the surplus coating material in the branch pipe 10A into the main pipe 1. Thereafter, the coating material in the main pipe 1 is fed to the branch pipe 10B and these operations are repeated successively, so that the branch pipes 10A, 10B and 10C are twice-coated, that is, the total lining time becomes longer. Consequently, it is difficult to complete the lining within the pot life of the coating material.

In the method described in the above Japanese Patent Publication No. 55911/87, the change in pressure is of a very small value. So in order to prevent the operator from overlooking such a pressure change it is necessary to monitor the pressure gauge, concentrating the attention of the operator thereon at all times. But this is very difficult in a working site frequented by a large number of people. Means for monitoring which employ a recorder is disadvantageous in that the equipment cost is high.

In the method described in the above Japanese Patent Laid-Open No. 10707/87, the measurement of a pressure change would be next to impossible without an automatic recorder. The use of an automatic recorder leads to an increase in cost.

In the method described in the above Japanese Patent Publication No. 26830/87, the time required for lining each of the branch pipes 10A, 10B and 10C is calculated before the lining operation. But the time required for the lining operation is influenced by various factors such as the temperature of the coating material, the flow velocity of the air being fed and the temperature thereof. So even if such time is calculated beforehand, it involves a large error, making it impossible to effect the lining operation to a satisfactory extent. Performing the lining operation with a certain time delay is also difficult in working sites where there are complicated passages.

Where the main pipe 1 is very long, for example, in case of a main pipe 20 mm or so in bore and 20 m or more in length, it will take a long period of time for lining the main pipe 1 and so it becomes difficult to complete the lining operation within the pot life of the coating material.

SUMMARY OF THE INVENTION

It is the object of the present invention to provide a lining method capable of lining a multibranch piping having a long main pipe within the pot life of a coating material without leaving uncoated area or having to apply excessive repeated coatings and also capable of being practiced easily without the need of using expensive devices, etc.

The present invention is a method for lining the inner surface of a multibranch piping having a plurality of branch pipes branched from a main pipe, by feeding a coating material and air into the pipes from an end portion of the main pipe or of a branch pipe.

For lining the main pipe, a coating material and then air are fed into the main pipe from a start end portion thereof, and when the coating material is discharged from a terminal end of the main pipe, it is assumed that the lining operation was completed. Or the lining operation is separated into a step wherein the coating material and air are fed from the start end portion of the main pipe up to end portions of branch pipes halfway in the main pipe and a step wherein the coating material and air are fed from the branch pipe end portions halfway in the main pipe up to the terminal end of the main pipe.

The lining of branch pipes is performed for each of the branch pipes by feeding a coating material and air. As means for detecting a completed time point of each branch pipe lining, there is adopted any of the following methods (A), (B) and (C). (A) First, the lining of a main pipe is performed and the lining speed required in the main pipe lining is calculated, then the length of a branch pipe to be subjected to lining is divided by the said lining speed to obtain an estimated lining time for the branch pipe, and a coating material is fed from an end portion of the branch pipe and air is fed for a time a little longer than the said estimated lining time.

(B) A coating material and then air are fed from an end portion of a branch pipe and a change in gas pressure in a main pipe which change occurs upon the coating material reaching the connection between the branch pipe and the main pipe under the feed of air is detected by a pressure gauge, when it is determined that the lining of the branch pipe was completed.

(C) A coating material and then air are fed from an end portion of one branch pipe, and when the coating material is discharged from an end portion of another branch pipe close to the one branch pipe, it is determined that the lining of the two branch pipes was completed.

In the method (A) it is necessary that the lining of the main pipe be performed in advance of the lining of the branch pipe, while in the methods (B) and (C) it does not matter whether the lining of the main pipe is before or after the lining of the branch pipes.

DESCRIPTION OF THE PREFERRED EMBODIMENTS

First, a concrete example in case of the foregoing method (A) being selected will be described below.

In the case where a coating material and then air are fed from one end of a pipe to effect the lining operation up to the other end of the pipe, the coating material will advance at a fixed speed through the pipe if conditions such as the temperature of the coating material, that of the pipe and the flow velocity of the air being fed etc. are the same. And it turned out as a result of an experiment that under the above conditions, the advancing speed of the coating material was almost the same, if the above even at different pipe bores. The foregoing method (A) is based on such a finding. The amount of a coating material is 100 g to 300 g per meter of a 1-inch pipe. The amount of air is selected to give a flow velocity of 50 to 200 m/sec in terms of atmospheric pressure.

Embodiment 1

Figure 1:
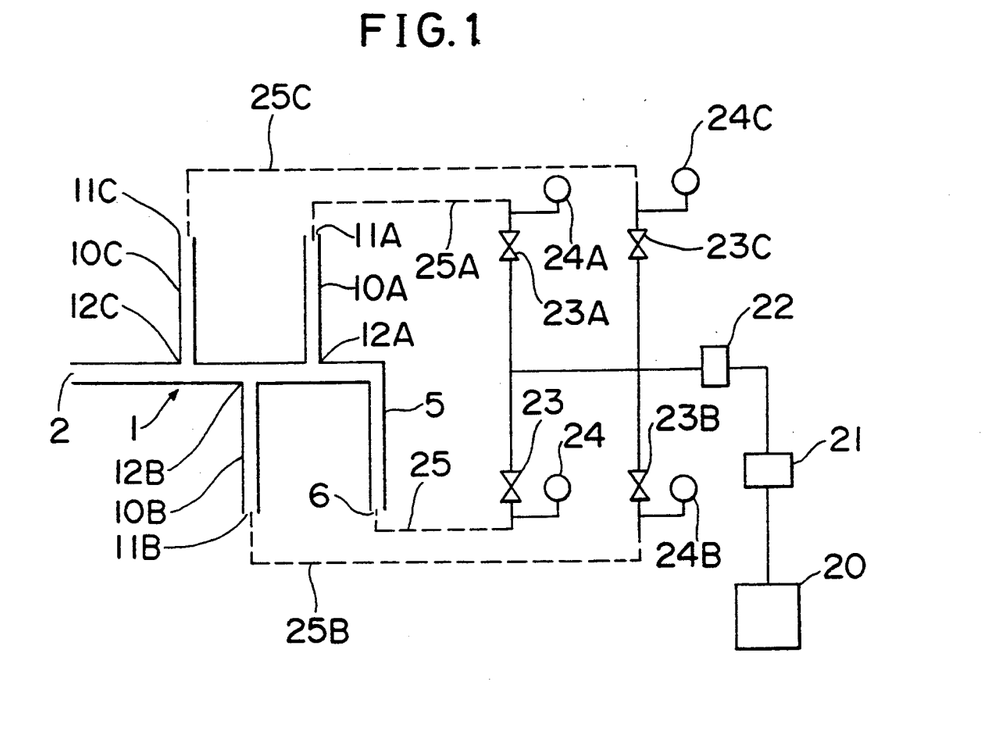
FIGS. 1 and 2 are explanatory views of an embodiment 1 of the present invention.

According to this embodiment 1, as shown in FIG. 1, in lining the inner surface of a multibranch piping having a plurality of branch pipes 10 branched from a main pipe 1, by feeding a coating material and air into the piping, first the coating material and then air are fed from a start end 6 of the main pipe 1 to effect lining of the pipe inner surface up to a terminal end 2 of the main pipe 1. At the same time, the time required of the lining operation from the start end 6 of the main pipe 1 up to the terminal end 2 thereof is measured and the lining speed is calculated on the basis of the lining time thus measured. Then, the coating material and then air are fed from ends 11 of the branch pipes 10 under almost the same conditions as in the lining operation from the start end 6 of the main pipe 1 up to the terminal end 2 thereof. In this case, the feed of air is continued for a little longer than the time obtained by dividing the length from the end 11 of each branch pipe 10 up to a branch point 12 by the lining speed in the area from the start end 6 of the main pipe 1 up to the terminal end 2 thereof, to thereby effect the lining of the inner surfaces of the branch pipes 10.

When a coating material is fed from the start end 6 of the main pipe 6 and air fed toward the terminal end 2 of the main pipe, the coating material advances at a fixed speed which depends on such conditions as the temperature of the coating material, that of the pipe, as well as the temperature and flow velocity of the air being fed, etc., and reaches the terminal end 2.

It turned out that even if the bore of each branch pipe 10 was different from that of the main pipe 1, the advancing speed of the coating material in the branch pipe would also substantially be the same if the aforesaid conditions were the same. Therefore, for a given length of the branch pipes, indicated at 10A, 10B and 10C it is possible to calculate the time required for lining each branch pipe 10. By pouring the coating material from the end 11 of the branch pipe 10 and feeding air from the end 11 for the calculated time, it is possible to effect the lining of the branch pipe 10 accurately without having to make certain that the coating material has reached the branch point 12.

FIG. 1 shows an example in which the present invention was applied to a water supply piping in a multiple dwelling house. The pipes were all ¾ inch in diameter; the length from the start end 6 to the terminal end 2 was 14 m; and the branch pipes were all 3 m in length.

In preparing for the lining operation, a water meter is removed from the terminal end 2 of the main pipe 1, cocks are removed from the start end 6 of the main pipe 1 and also from ends 11A, 11B and 11C of the branch pipes 10A, 10B and 10C, respectively, then connection pipes are connected to the start end 6 and the ends 11A, 11B and 11C so that their openings face upwards, which openings are each formed to permit an air hose to be attached thereto and detached therefrom. To an air hose 25 connected to the start end 6 of the main pipe 1 there are connected a pressure gauge 24 and a valve 23, while to air hoses 25A, 25B and 25C connected, respectively, to the ends 11A, 11B and 11C of the branch pipes 10A, 10B and 10C there are connected pressure gauges 24A, 24B, 24C and valves 23A, 23B, 23C, the valves 23, 23A, 23B and 23C being connected to an air compressor 20 through a flow meter 22 and then through a dehumidifier 21.

In the lining operations, an amount of 1340 g of a coating material comprising an epoxy resin as a main component with a hardener incorporated therein is required for lining from the start end 6 of the main pipe 1 up to the terminal end 2 thereof, said amount of the coating material is measured using a measuring cup and poured in that amount into the main pipe at the start end 6 thereof.

Then, the air hose 25 is connected to the start end 6 and the valve 23 is opened to allow feeding from the start end of the main pipe 1 2.2 Nm$^3$/min of compressed air which has been fed from the air compressor 20 and passed through the dehumidifier 21 and the flow meter 22. In this case, the valves 23A, 23B and 23C of the air hoses 25A, 25B and 25C are kept closed.

As a result, the coating material advances toward the terminal end 2 which is an opened of the main pipe 1, and is discharged from the terminal end 2 while hardly flowing into the branch pipes 10A, 10B and 10C, whereupon the valve 23 is closed to stop the feed of air. A transparent hose is attached to the terminal end 2 to make certain with the naked eye that the coating material reached the terminal end.

During the above lining operation, the time required from when the valve 23 was opened until when the coating material reached the terminal end 2 of the main pipe 1 was 3 minutes and 30 seconds.

Next, the air hose 25A is removed from the end 11A of the branch pipe 10A and the amount 290 g, of the coating material required for lining the pipe inner surface from the end 11A up to the branch point 12A is measured, then the coating material is poured in that amount from the end 11A into the branch pipe 10A. The air hose 25A is connected to the end 11A and the valve 23A is opened to feed air.

In this case, the time TA required for lining the branch pipe 10A from the end 11A to the branch point 12A is calculated by the following equation:

$$TA = a \times \frac{LA}{L} \times T$$

where
- $a$: safety factor, usually 1.2 to 1.5
- $L$: length from the end 6 to the terminal end 2
- $LA$: length from the end 11A to the branch point 12A
- $T$: time required for lining from the end 6 up to the terminal end 2

In this case, $TA = 1.5 \times 3/14 \times 210'' = 68''$

Upon a lapse of TA second after the opening of the valve 23A, the valve 23A is closed to terminate the lining of the branch pipe 10A.

Further, to the extent possible, the temperature of the coating material for the branch pipe 10A is set at the same as the temperature of the coating material for the main pipe 1 which is at a temperature of 30° C.; the amount of air to be fed is determined according to the inside diameter of the branch pipe 10A so as to become substantially the same as the air feeding rate, 2.20 Nm$^3$/min, in the main pipe 1; and the other pipes are also maintained at the same temperature and air feed rate.

Lining of the branch pipes 10B and 10C is also performed in the same manner.

As a result, there was formed a coating 0.3–2.0 mm in thickness.

In this embodiment, as compared with the lining method wherein the coating material is fed from one point to effect the lining of all of the main and branch pipes, the time required for the lining is about half and thus very efficient.

In such a multibranch piping as shown in FIG. 1, when the inside diameter of the pipe 5 which constitutes a part of the main pipe 1 is different from that of the main pipe 1, if air is fed from the end 6, the flow velocity of the air being fed will be different between the pipe 5 and the main pipe 1, thus different in air feeding conditions. But this difference may be ignored when the main pie 1 and the pie 5 are not significant different in inside pie 1 and the pipe 5 are not significant different in inside diameter or when the pipe 5 is short.

Figure 2:
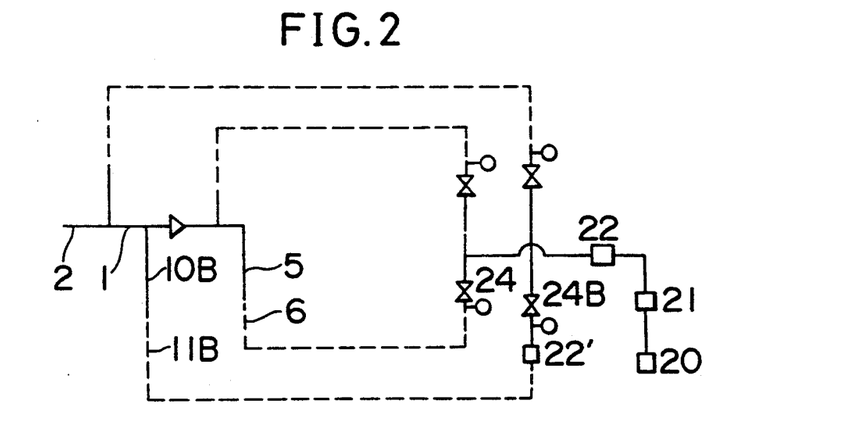

On the other hand, when the inside diameter of the main pipe 1 and that of the pipe 5 are significantly different and the pipe 5 is long, an air flow meter 22' is provided between the pressure gauge 24 and the end 11 to give a substantially fixed velocity of the air being fed in both the pipe 5 and the main pipe 1, as shown in FIG. 2, and the lining speed (required time) at the inner surface of the main pipe 1 is determined by feeding air from a branch pipe 10. The air flow rate in the pipe 5 is determined as a difference between the values on the flow meters 22 and 22'.

In lining a complicated multibranch piping, it is impossible to judge from the outside of the building from where a main pipe starts and where it terminates. Therefore, the range of the main pipe is assumed to be from an optionally-selected branch pipe up to a branch pipe which is presumed to be furthest therefrom.

Embodiment 2

Figure 3:
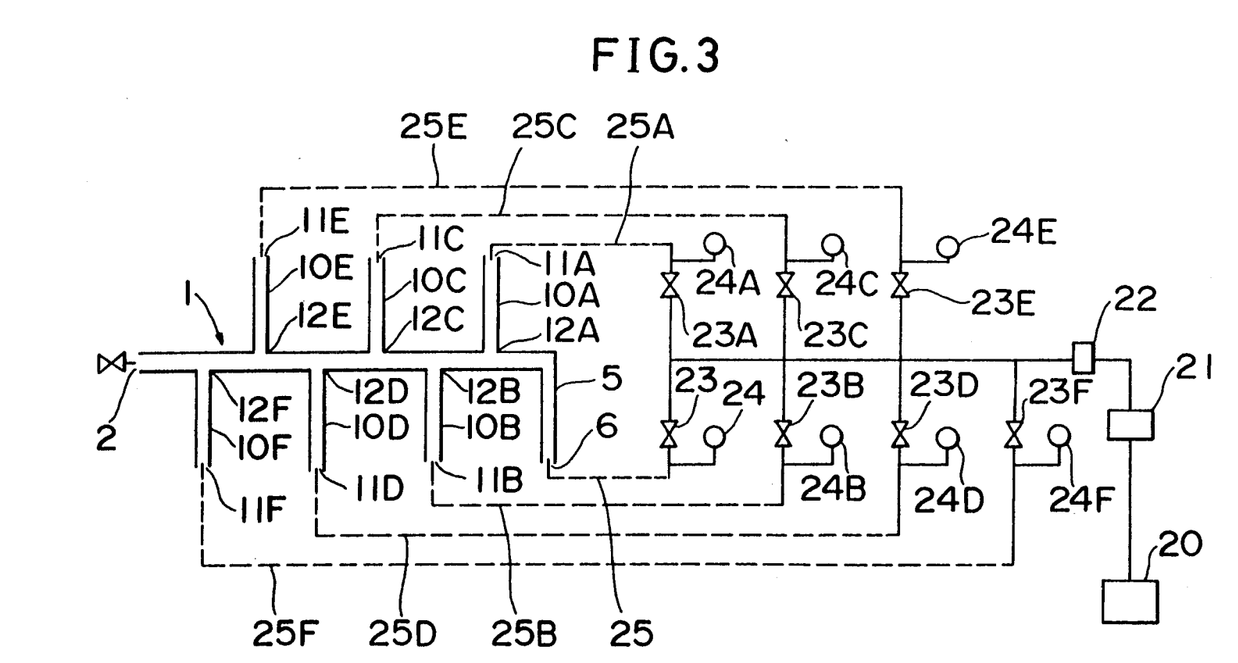
FIG. 3 is an explanatory view of an embodiment 2 of the present invention.

According to this embodiment, in lining the inner surface of a multibranch piping having a main pipe 1 and branch pipes branched therefrom by feeding a coating material and then air into the piping, first the coating material and then air are fed from the main pipe 1 to effect lining of the pipe inner surface up to an end 11 of a branch pipe 10 branched halfway from the main pipe 1, or the coating material and then air are fed from the end 11 of the branch pipe 10 to effect lining of the pipe inner surface up to a terminal end 2 of the main pipe 1. Either method is adopted. At the same time, the time required for lining the pipe inner surface is measured to calculate the lining speed. Then, the lining of the other pipe inner surface as well as the lining of another branch pipe 10 are performed successively. In this case, the lining of the said another branch pipe 10 is effected by feeding the coating material and then air from the end 11 of the pipe under substantially the same conditions as in the above lining operation in which the lining time was measured. The feed of air is performed for a time a little longer than the time obtained by dividing the length from the end 11 of the branch pipe 10 up to the branch point 12 by the lining time calculated above.

When the coating material and then air are fed from a start end 6 of the main pipe 1 or from an end 11C of a branch pipe 10C branched halfway from the main pipe 1, the coating material advances through the pipe at a fixed speed which depends on such conditions as the coating material temperature, pipe temperature, as well as the temperature and flow velocity of the air being fed, etc., and reaches the end 11C of the branch pipe 10C or the terminal end 2 of the main pipe 1 to effect the lining of the pipe inner surface.

In the above lining operation, the time required for the lining operation is measured to calculated the lining speed.

Even when the pipes to be lined are different in inside diameter, the time required for the lining operation from ends 11A, 11B and 11D-11F of branch pipes 10A, 10B, 10D-10F up to branch points 12A, 12B, 12D-12F can be calculated because the coating material advances through the pipes at substantially the same speed if the above lining conditions are the same.

FIG. 3 is explanatory view of an example in which the present invention was applied to a water supply piping in a multiple dwelling house. The main pipe 1 in this water supply piping is provided at an end portion thereof with a pipe 5 which is a type of a branch pipe, with branch pipes 10A, 10B 10C, 10D, 10E and 10F being connected to the main pipe 1 between the pipe 5 and a terminal end 2 of the main pipe. The pipes are all ¾ inch in diameter; the length from the start end 6 to the branch pipe 12C is 15 m; and the branch pipes are each 3 m in length.

In preparing for the lining operation, in the same way as in the previous embodiment, a water meter is removed from the terminal end 2 of the main pipe 1, cocks are removed from the start end 6 of the main pipe 1 and also from ends 11A-11F of the branch pipes 10A-10F, and connection pipes are connected to the start end 6 and the ends 11A-11F so that their openings face upwards, which openings are each formed to permit an air hose to be attached thereto and detached therefrom. To an air hose 25 connected to the start end 6 of the main pipe 1 there are connected a pressure gauge 24 and a valve 23, while to air hoses 25A-25F connected respectively to the ends 11A-11F of the branch pipes 10A-10F there are connected pressure gauges 24A-24F and valves 23A-23F, the valves 23 and 23A-23F being connected to an air compressor 20 through a flow meter 22 and then through a dehumidifier 21. And a valve is mounted to the terminal end 2 of the main pipe 1.

In the lining operation, an amount of 1730 g of a coating material comprising an epoxy resin as a main component with a hardner incorporated therein is required for lining from the start end 6 up to the end 11C of the branch pipe 10C, said amount of the coating material is measured using a measuring cup and poured in that amount into the pipe.

Then, the air hose 25 is connected to the start end 6 and the valve 23 is opened to allow feeding from the end 6 of the pipe 5 2.2 Nm³/min of compressed air which has been fed from the air compressor 20 and passed trough the dehumidifier 21 and the flow meter 22. In this case, the valves 23A, 23B, 23D, 23E, 23F in the branch pipes 10A, 10B, 10C, 10D, 10E, 10F and the valve in the terminal end 2 of the main pipe 1 are kept closed.

As a result, the coating material advances from the start end 6 toward the end 11C of the branch pipe 10C, passes the branch point 12C and is finally discharged form the end 11C while hardly flowing into the branch pipes 10A, 10B and the pipe portion the terminal end 2 side, whereupon the valve 23 is closed to stop the feed of air. A transparent hose is attached to the end 11C to make certain with the naked eye that the coating material reached the end 11C.

During the above lining operation, the time required from when the valve 23 was opened until when the coating material reached the end 11C is measured with a stopwatch.

Then, the air hose 25A is removed from the end 11A of the branch pipe 10A and the amount of 290 g of the coating material required for lining the pipe inner surface from the end 11A up to the branch point 12A is measured and the coating material is fed in that amount from the end 11A, then the air hose 25A is connected to the end 11A and the valve 23A is opened to feed air.

In this case, the time, TA=68 sec, required for lining from the end 11A of the branch pipe 10A up to the branch point 12A, is calculated by the equation described in Embodiment 1.

Then, the valve 23A is closed upon lapse of TA seconds after is opened, to complete the lining for the branch pipe 10A.

Further, to the extent possible, the temperature of the coating material for the branch pipe 10A is held at the same level as the temperature, as a reference temperature, of the coating material for the main pipe 1; the amount of air to be fed is determined according to the inside diameter of the branch pipe 10A so as to become substantially the same as the air feeding rate in the main pipe 1; and the other pipes are also maintained at the same temperature and air feed rate.

The lining of the branch pipe 10B is also performed in the same manner.

Next, the valve at the terminal end 2 of the main pipe 1 is removed, while the other valves are closed, then the coating material in an amount determined according to the length of the pipe and then air are fed to effect the lining operation of the pipe inner surface from the end 11C of the branch pipe 10C up to the terminal end 2 of the main pipe 1. Further, also as to the branch pipes 10D, 10E and 10F, the lining operation is performed in the same manner as in the lining of the branch pipe 10A.

In the above multibranch piping, if the start end side of the main pipe 1 and the terminal end 2 side thereof are different in conditions such as temperature, etc., then at the time of lining operation of from the end 11C of the branch pipe 10C up to the terminal end 2 of the main pipe 1, the time required for the lining operation is measured in the same way as in the lining operation of from the start end 6 of the main pipe 1 up to the end 11C of the branch pipe 10C and the lining speed is calculated on the basis thereof. Subsequent lining of the branch pipes 10D, 10E and 10F is performed by feeding air for a time calculated on the basis of such lining speed on the terminal end 2 side of the main pipe 1.

The state and countermeasure in case of different inside diameters of the pipe 5 and the main pipe 1 in the multibranch piping are the same as in the embodiment 1.

Where the main pipe 1 is very long, exceeding 40 m, the main pipe may be divided into three or more portions for the lining operation.

Although in the above embodiment lining operation was performed first for the start end side of the main pipe 1 from the start end 6 of the main pipe up to the end 11C of the branch pipe 10C, the lining operation may initially cover from the end 11C of the branch pipe 10C up to the terminal end 2 of the main pipe 1.

Further, the lining operation may be performed by first lining the pipe inner surface of either the start end side of the main pipe 1 or the terminal end 2 side thereof, subsequently lining the pipe inner surface of the other side and then lining the remaining branch pipe 10.

In the present invention, as set forth above, first the lining speed in the main pipe 1 is calculated and lining of the branch pipe 10 is performed at said lining speed, so it is possible to effect the lining of the branch pipe 10 even without making sure of the arrival of the coating material at the branch point 12 of the branch pipe 10. Consequently, even if the main pipe 1 and the branch 10 are lined separately, the lining of the inner surface of the multibranch piping can be completed easily and in a short period of time without leaving an uncoated area or any or excessive repeated coating and without using expensive devices, etc.

By dividing the main pipe 1 into lining portions, carrying out the lining operation for a divided portion while calculating the lining speed and subsequently lining the other portion of the main pipe 1 and the branch pipe 10, it is possible to effect the lining operation within the pot life of the coating material even for a pipe which is long from the start end 6 up to the terminal end 2.

The following description is now provided for an embodiment wherein the foregoing method (B) is adopted.

Embodiment 3

Figure 4:
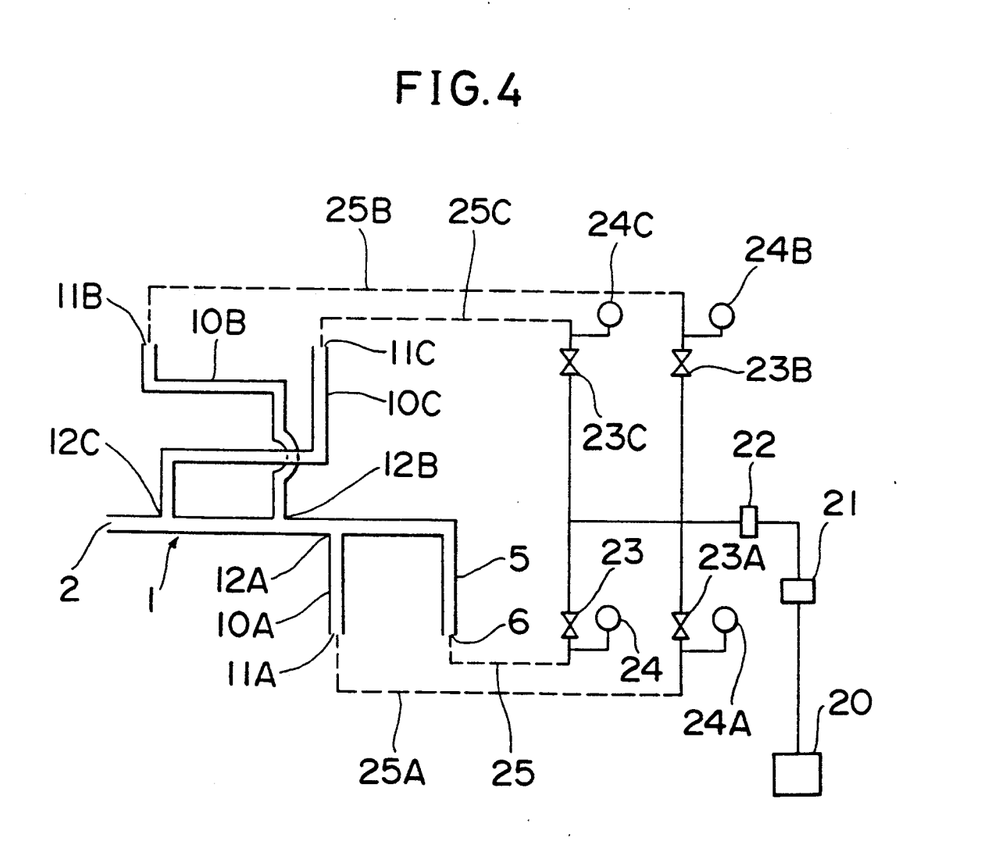
FIG. 4 is an explanatory view of an embodiment 3 of the present invention.

According to this embodiment, in lining the inner surface of a multibranch piping having a plurality of branch pipes 10 branched from a main pipe 1 by feeding a coating material and then air into the multibranch piping, the coating material and then air are fed from an end 11 of the branch pipe 10 after or before feeding the coating material and air into the main pipe 1 to line the inner surface thereof, and a change in gas pressure in the main pipe 1 on an upstream side of a branch point 12 of the branch pipe 10 (the connection between the main pipe 1 and the branch pipe 10) caused by the coating material reaching the branch point 12 is detected by a pressure gauge 24 disposed upstream of the main pipe 1 to complete the lining of the branch pipe 10.

If the coating material and then air are fed from an end 11A of one branch pipe 10A after or before feeding the coating material and air into the main pipe 1 to effect the lining of the inner surface of the main pipe, the coating material will advance through the branch pipe 10A and reaches a branch point 12A of the branch pipe 10A.

When the coating material has reached the branch point 12A, the gas pressure in the main pipe 1 on an upstream side of the branch point 12A instantaneously increases a small amount. This change in gas pressure in the main pipe 1 is detected by the pressure gauge 24 disposed upstream of the main pipe 1 to complete the lining of the branch pipe 10A.

Lining of the other branch pipes 10B and 10C is also performed in the same manner. A change in gas pressure in the main pipe 1 is detected by the pressure gauge 24 disposed upstream of the main pipe 1 to complete the lining of the branch pipes 10B and 10C.

FIG. 4 is an explanatory view of an example in which the present invention was applied to a water supply piping in a multiple dwelling house. The main pipe 1 in this water supply piping is provided at an end portion thereof with a pipe 5 which is a type of a branch pipe, with branch pipes 10A, 10B and 10C being connected to the main pipe 1 between the pipe 5 and a terminal end 2 of the main pipe. The length from a start end 6 to the terminal end 2 is 15 m; the length of each branch pipe is 3 m; and all of the pipes are ⅜ inch in diameter.

In preparing for the lining operation, a water meter is removed from the terminal end 2 of the main pipe 1, cocks are removed from an end of the pipe 5 (the starting end of the main pipe 1) 6 and also from one ends 11A–11C of the branch pipes 10A–10C, and connection pipes are connected to the start end 6 and the ends 11A–11C so that their openings face upwards, which openings are each formed to permit an air hose to be attached thereto and detached therefrom. To an air hose 25 connected to the start end 6 of the main pipe 1 there are connected a pressure gauge 24 and a valve 23, while to air hoses 25A–25C connected respectively to the ends 11A–11C of the branch pipes 10A–10C there are connected pressure gauges 24A–24C and valves 23A–23C, the valves 23 and 23A–23C being connected to an air compressor 20 through a flow meter 22 and then through a dehumidifier 21.

For lining the main pipe 1 in this embodiment, the amount of 1440 g, of a coating material required for the lining operation from the start end 6 up to the terminal end 2 of the main pipe 1, said amount of the coating material is measured using a measuring cup and poured in that amount into the pipe. The coating material is a mixture of an epoxy resin as a main component and a hardener.

Then, the air hose 25 is connected to the start end 6 and the valve 23 is opened to feed compressed air from the start end 6 of the main pipe 1 which has been fed from the air compressor 20 and passed through the dehumidifier 21 and the flow meter 22. In this case, the valves 23A–23C in the branch pipes 10A–10C are closed and a transparent hose is connected to the terminal end 2 of the main pipe 1.

The coating material advances from the start end 6 toward the terminal end 2 of the main pipe 1 and reaches the terminal end 2 while scarcely flowing into the branch pipes 10A–10C. That arrival is confirmed with the naked eye to terminate the lining of the main pipe 1. In this case, it is appropriate that the advancing speed of the coating material be in the range of 1 to 4 m/min.

Then, the air hose 25A is removed from the end 11A of the branch pipe 10A and the coating material is fed in an amount of 290 g required for lining the pipe inner surface from the end 11A up to the branch point 12A, then the air hose 25A is connected to the end 11A and the valves 23, 23B and 23C are closed, while the valve 23A is opened to feed air from the end 11A at a rate of 2.2 Nm$^3$/min.

Upon the coating material reaching the branch point 12A, the intra-pipe gas pressure on the upstream side of the main pipe 1 increases a small amount (0.1–1.0 kg/cm$^2$) instantaneously and this is detected by the pressure gauge 24 disposed upstream of the main pipe 1 to terminate the lining of the branch pipe 10A.

Also as to the other branch pipes 10B and 10C, the coating material and then air are fed from the ends 11B and 11C. That the coating material has reached the branch points 12B and 12C is detected by the pressure gauge 24.

Although in the above embodiment the pipe portion from the start end 6 of the main pipe 1 up to the terminal end 2 thereof was lined and then the branch pipes 10A, 10B and 10C were lined successively, the lining operation may be performed by first lining the branch pipes 10A, 10B, 10C and thereafter lining the pipe portion from the start end 6 of the main pipe 1 up to the terminal end 2 thereof. And there is no limitation on the order of the lining of the branch pipes 10A, 10B, 10C.

Further, in the case where the main pipe 1 is so long that the lining operation from the start end 6 up to the terminal end 2 is difficult to be completed within the pot life of the coating material, the lining operation may be performed by first lining the pipe portion from the first end 6 of the main pipe 1 up to the end 11 of a branch pipe 10 and then lining the pipe portion from the end 11 of a branch pipe 10 positioned on the upstream side close to the lined branch pipe 10 up to the terminal end 2 of the main pipe 1.

In FIG. 4, a plurality of like portions such as the branch pipes are indicated using such reference numerals as 10A, 10B and 10C, but in the description of the specification, when no specifying is made to any of the branch pipes 10A, 10B and 10C, that is, when the branch pipe concerned may be any of them, the branch pipe is expressed like a branch pipe 10.

According to this embodiment, in lining the pipe portion from the end 11 of a branch pipe 10 up to the branch point 12, of the coating material arriving at the branch point 12 is detected by detecting a change in gas pressure in the main pipe 1 on the upstream side of the branch point 12, and this detection is effected by the pressure gauge 24 disposed on the upstream side. Therefore, the completion of the lining operation in each of branch pipe 10 can be detected by one or more pressure gauges 24, and even when the branch pipes 10 are not, as illustrated in the drawings, for example, even when they cross each other, it is possible to effect the lining of the multibranch piping easily by a small number of workers and that accurately without overlooking. Further, since the main pipe 1 and each branch pipe 10 are subjected to being lined separately, it is possible to prevent the likelihood of remaining uncoated area and also prevent the reduction of the pipe diameter caused by repeated coating.

The following description is now provided about an embodiment wherein the foregoing method (C) is adopted.

Embodiment 4

Figure 5:
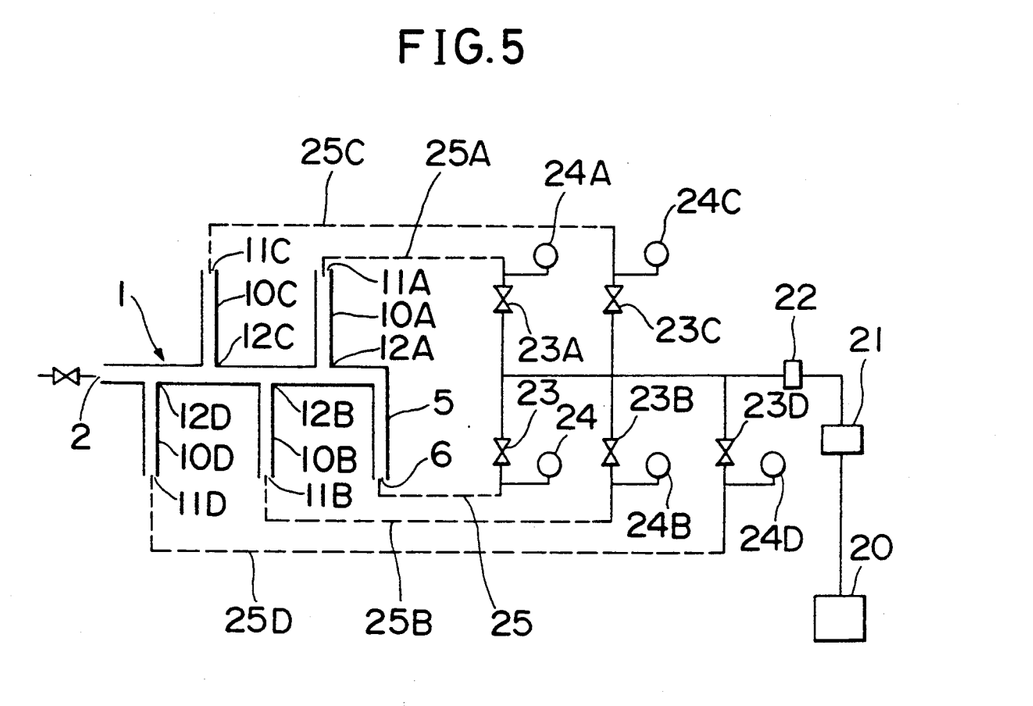
FIG. 5 is an explanatory view of an embodiment 4 of the present invention.

According to this embodiment, in lining the inner surface of a multibranch piping having a plurality of branch pipes 10 branched from a main pipe 1 by feeding a coating material and then air into the multibranch piping, the coating material and then air are fed from an end 11 of one branch pipe 10 after or before feeding the coating material and then air into the main pipe 1 to line the inner surface thereof to effect the lining of the pipe inner surface up to an end 11 of another branch pipe 10 close to the said one branch pipe 10.

Thus, in lining the inner surface of such multibranch piping in the above manner, the pipes to be lined are separated into the main pipe 1 and a group of branch pipes 10. And in the branch pipe group 10, one branch pipe, e.g. 10A, and a branch pipe 10B located in a position close to the branch pipe 10B are combined as one set in the lining operation.

That is, a coating material and then air are fed from an end 11A of the branch pipe 10A to line the pipe portion up to an end 11B of the branch pipe 10B. In this case, the lining distance corresponds to the sum of the length of the branch pipe 10A, that of the branch pipe 10B and that of the main pipe portion between branch points 12A and 12B. Therefore, the lining distance and also the lining time are short. Where there are a larger number of branch pipes 10, those branch pipes are subjected to being lined in the same manner.

Further, before or after lining the branch pipe 10 group, the coating material and then air are fed into the main pipe 1 for the lining operation, but in this case the lining operation is performed to the exclusion of the many branch pipes 10, so that the lining time is short.

Besides, there is no fear of remaining uncoated area because the end of each lining operation can be confirmed in the position in which the lining is terminated.

FIG. 5 is an explanatory view of an example in which the present invention was applied to a water supply piping in a multiple dwelling house. The main pipe 1 in this water supply piping is provided at an end portion thereof with a pipe 5 which is a type of a branch pipe, with branch pipes 10A, 10B, 10C and 10D being connected to the main pipe 1 between the pipe 5 and a terminal end 2 of the main pipe 1. All the pipes are $\frac{3}{4}$ inch in diameter; the length from a start end 6 up to the terminal end 2 is 20 m; and the branch pipes are each 3 m in length.

In preparing for the lining operation, a water meter is removed from the terminal end 2 of the main pipe 1, cocks are removed from an end of the pipe 5 (the starting end of the main pipe 1) 6 and also from ends 11A–11D of the branch pipes 10A–10D, and connection pipes are connected to the start end 6 and the ends 11A–11D so that their openings face upwards, which openings are each formed to permit an air hose to be attached thereto and detached therefrom. To an air hose 25 connected to the start end 6 of the main pipe 1 there are connected a pressure gauge 24 and a valve 23, while to air hoses 25A–25D connected respectively to the ends 11A–11D of the branch pipes 10A–10D there are connected pressure gauges 24A–24D and valves 23A–23D, the valves 23 and 23A–23D being connected to an air compressor 20 through a flow meter 22 and then through a dehumidifier 21. And a valve is mounted at the terminal end 2 of the main pipe 2.

In the lining operation, an amount of 1920 g of a coating material is required for lining from the start end 6 up to the terminal end 2 of the main pipe 1, said amount of the coating material is measured using a measuring cup and poured in that amount into the start end 6 of the main pipe 1. The coating material is a mixture of an epoxy resin as a main component and a hardener. In the case where an exact length from the start end 6 up to the terminal end 2 is not clear, the coating material is fed in a larger amount by 10–20%

Then, the air hose 25 is connected to the start end 6 and the valve 23 is opened to feed from the start end 6 of the main pipe 1 2.2 Nm$^3$/min of compressed air which has been fed from the air compressor 20 and passed through the dehumidifier 21 and flow meter 22. In this case, the valves 23A–23D of the branch pipes 10A–10D are closed, the valve at the terminal end 2 of the main pipe 1 is removed, and a transparent hose is connected to the terminal end 2.

The coating material advances from the start end 6 toward the terminal end 2 of the main pipe 1 and reaches the terminal end 2 while scarcely flowing into the branch pipes 10A–10D. That is confirmed with the naked eye to terminate the lining of the main pipe 1. In this case, it is appropriate that the advancing speed of the coating material be in the range of 1 to 4 m/min.

Then, the valve is mounted to the terminal end 2 of the main pipe 1 and closed, the valve 23 on the start end 6 side of the main pipe is closed, the air hose 25A is removed from the end 11A of the branch pipe 10A, the air hose 25 is removed from the end 11B of the branch pipe 10B located close to the branch pipe 10A, and a transparent hose is connected to the end 11B.

Next, the amount of 670 g, of the coating material is required for lining the pipe inner surface from the end 11A of the branch pipe 10A up to the end 11B of the branch pipe 10B, said amount of the coating material is measured and poured in that amount from the end 11A, then the air hose 25A is connected to the end 11A and the valve 23A is opened to feed air. Thereafter, the coating material arriving the end 11B of the branch pipe 10B is confirmed to terminate the lining of the pipe portion from the end 11A to the end 11B.

Then, in the same manner as above there is performed the lining of the pipe inner surface from the end 11C of the branch pipe 10C up to the end 11D of the branch pipe 10D.

Although in the above embodiment the lining of the main pipe 1 is first performed followed by the lining operation of a branch pipe 10, this lining operation order may be reversed.

In the case where the portion from the start end 6 of the main pipe 1 up to the terminal end 2 thereof is so long that it is difficult to complete the lining operation within the pot life of the coating material, there may be performed the lining of for the main pipe 1 in a divided manner, first from the start end 6 of the main pipe up to the end 11 of a branch pipe 10 disposed halfway of the main pipe and then from the said end 11 to the terminal end 2 of the main pipe 1.

Thus, according to this embodiment, in a multibranch piping having a plurality of branch pipes 10, the lined area of the piping is divided into the main pipe 1 and the branch pipes 10, and the coating material and then air are fed from the end 11 of one branch pipe 10 to effect the lining of the pipe inner surface up to the end 11 of another branch pipe 10 located in a position close to said one branch pipe 10. Therefore, even where there are a large number of branch pipes 10, the lining can be performed in the same manner by dividing those branch pipes 10 into several combinations. Thus, it is possible to effect each lining operation within the pot life of the coating material.

Further, since each lining operation is terminated upon making certain that the coating material reached the end 11 of each branch pipe 10 or the terminal end 2 of the main pipe 1, there will be no uncoated portion although the main pipe 1 is partially twice-coated.

What is claimed is:

1. In a method for lining the inner surface of a multibranch piping having a main pipe and a plurality of branch pipes branched from the main pipe which comprises feeding a coating material and then air into the piping from an end portion of either the main pipe or any one of the branch pipes, the improvement characterized in that the lining of the branch pipes is performed by feeding the coating material and air for each of the branch pipes until detecting a completed time point of each of the branch pipes lined there is adopted either of the following methods:

(A) first the main pipe is subjected to the lining operation and then a length of the main pipe and lining time of the main pipe are measured,
   and a lining speed in the main pipe lining is calculated by dividing the length of the main pipe by the lining time of the main pipe,
   then lining time for the branch pipe is calculated by dividing the length of the branch pipe to be lined by said lining speed,
   and the coating material and air are fed from an end portion of the branch pipe for a time which is 1.2 to 1.5 times longer than said calculated lining time for branch pipe, the length of the main pipe generally only being exposed to the coating material once, or (B) first the main pipe is subjected to the lining operation and then the coating material and air are fed from an end portion of one of the branch pipes,
   then a change in gas pressure in the main pipe is detected by a pressure gauge connected to the start end of the main pipe,
   said change in gas pressure in the main pipe is on an upstream side of a branch point as a connection between the branch pipe and the main pipe and occurs upon the coating material reaching the branch point,
   and then the feeding of the coating material and air are stopped.

2. The lining method according to claim 1, wherein the lining of the main pipe is performed by feeding the coating material and then air into the main pipe from a start end portion of the main pipe, and upon discharge of the coating material from a terminal end of the main pipe it is determined that the lining is completed.

3. The lining method according to claim 1, wherein the lining of the main pipe is performed in a divided manner into a lining step of lining the pipe portion from a start end portion of the main pipe up to an end portion of a branch pipe branched from the main pipe and a lining step of lining the pipe portion from the end portion of said branch pipe up to a terminal end portion of the main pipe.

4. The lining method according to claim 1, wherein the gas pressure to be detected by the pressure gauge in said method (B) is the gas pressure in the main pipe portion located upstream of the branch point of the branch pipe.

5. In a method for lining the inner surface of a multibranch piping having a main pipe and a plurality of branch pipes branched from the main pipe which comprises feeding a coating material and then air into the piping from an end portion of either the main pipe or any one of the branch pipes, the improvement characterized in that the lining of the branch pipes is performed by feeding the coating material and air for each of the branch pipes until detecting a completed time point of each of the branch pipes lined, in said method there is adopted either of the following methods A or B:

A: (a) first the main pipe is subjected to the lining operation where the lining time of the main pipe is measured in order to calculate a lining speed in the main pipe by dividing the length of the main pipe by the lining time of the main pipe to thereby calculate lining time for a branch pipe to be lined by dividing the length of the branch pipe by said lining speed,
   (b) the coating material and air are fed from an end portion of the branch pipe for a time which is 1.2 to 1.5 times longer than said calculated lining time for the branch pipe,
   (c) and then the feeding of the coating material and air are stopped, or B: (a) the coating material and air are fed from an end portion of one of the branch pipes, after or before the main pipe is subjected to the lining operation,
   (b) a change in the main pipe is detected by a pressure gauge connected to the start end of the main pipe, said change in gas pressure in the main pipe being on an upstream side of a branch point as a connection between the branch pipe and the main pipe and occurring when the coating material reached the branch pipe,
   (c) and then the feeding of the coating material and air are stopped.

6. The lining method according to claim 5, wherein the lining of the main pipe is performed by feeding the coating material and then air into the main pipe from a start end portion of the main pipe, and upon discharge of the coating material from a terminal end of the main pipe determining that the lining is completed.

7. The lining method according to claim 5, wherein the lining of the main pipe is performed in a divided manner into a lining step of lining the pipe portion from a start end portion of the main pipe up to an end portion of a branch pipe branched from the main pipe and a lining step of lining the pipe portion from the end portion of said branch pipe up to a terminal end portion of the main pipe.

8. The lining method according to claim 5, wherein the gas pressure to be detected by the pressure gauge in said method (B) is the gas pressure in the main pipe portion located upstream of the branch point of the branch pipe.

* * * * *